(12) United States Patent
Rohee et al.

(10) Patent No.: US 6,902,235 B2
(45) Date of Patent: Jun. 7, 2005

(54) RUNNER FOR A MOTOR VEHICLE SEAT

(75) Inventors: René Rohee, La Chapelle Biche (FR); Jean-Marie Fretel, Ger (FR)

(73) Assignee: Faurecia Sieges d'Automobile S.A., Nanterre (FR)

( * ) Notice: Subject to any disclaimer, the term of this patent is extended or adjusted under 35 U.S.C. 154(b) by 0 days.

(21) Appl. No.: 10/824,879

(22) Filed: Apr. 15, 2004

(65) Prior Publication Data

US 2004/0232750 A1 Nov. 25, 2004

(30) Foreign Application Priority Data

Apr. 17, 2003  (FR) .............................................. 03 04812

(51) Int. Cl.⁷ ................................................ A47C 1/02
(52) U.S. Cl. .................... 297/334; 297/341; 297/344.1; 248/424
(58) Field of Search .............................. 297/334, 341, 297/317, 318, 311; 248/429, 424, 430; 296/63, 68.1, 65.14

(56) References Cited

U.S. PATENT DOCUMENTS

| 5,172,882 | A |   | 12/1992 | Nini ........................... 248/430 |
| 5,516,071 | A | * | 5/1996  | Miyauchi ..................... 248/429 |
| 5,785,291 | A | * | 7/1998  | Chang ........................ 248/429 |
| 5,806,825 | A |   | 9/1998  | Couasnon .................... 248/429 |
| 5,931,436 | A |   | 8/1999  | Rohee ........................ 248/430 |
| 6,089,521 | A | * | 7/2000  | Tarusawa et al. ........... 248/430 |
| 6,098,946 | A | * | 8/2000  | Sechet et al. .............. 248/424 |
| 6,113,051 | A | * | 9/2000  | Moradell et al. ........... 248/430 |
| 6,126,133 | A | * | 10/2000 | Timon et al. ............... 248/429 |
| 6,641,104 | B2 | * | 11/2003 | Flick .......................... 248/430 |
| 6,688,574 | B2 | * | 2/2004  | Okazaki et al. ............. 248/424 |
| 6,772,985 | B2 | * | 8/2004  | Lee ............................. 248/424 |
| 6,843,532 | B2 | * | 1/2005  | Borbe et al. ........... 297/344.11 |

FOREIGN PATENT DOCUMENTS

| FR | 2 736 311 | 1/1997 | ........................ 2/8 |
| FR | 2 755 654 | 5/1998 | ........................ 2/8 |
| FR | 2 817 515 | 6/2002 | ........................ 2/7 |
| FR | 2 829 974 | 3/2003 | ........................ 2/8 |

* cited by examiner

Primary Examiner—Peter M. Cuomo
Assistant Examiner—Erika Garrett
(74) Attorney, Agent, or Firm—McCracken & Frank LLP

(57) ABSTRACT

A runner for a motor vehicle seat, said runner comprising firstly first and second rails mounted to slide relative to each other in a longitudinal direction, and secondly a locking mechanism including an additional latch mounted substantially to pivot on a main latch about a second pivot axis, the additional latch being interposed between the main latch and a control member so that, when the control member moves from the locking position to the unlocking position, firstly the additional catch is pivoted about the second pivot axis, and secondly the additional latch and the main latch are pivoted about the first pivot axis.

10 Claims, 4 Drawing Sheets

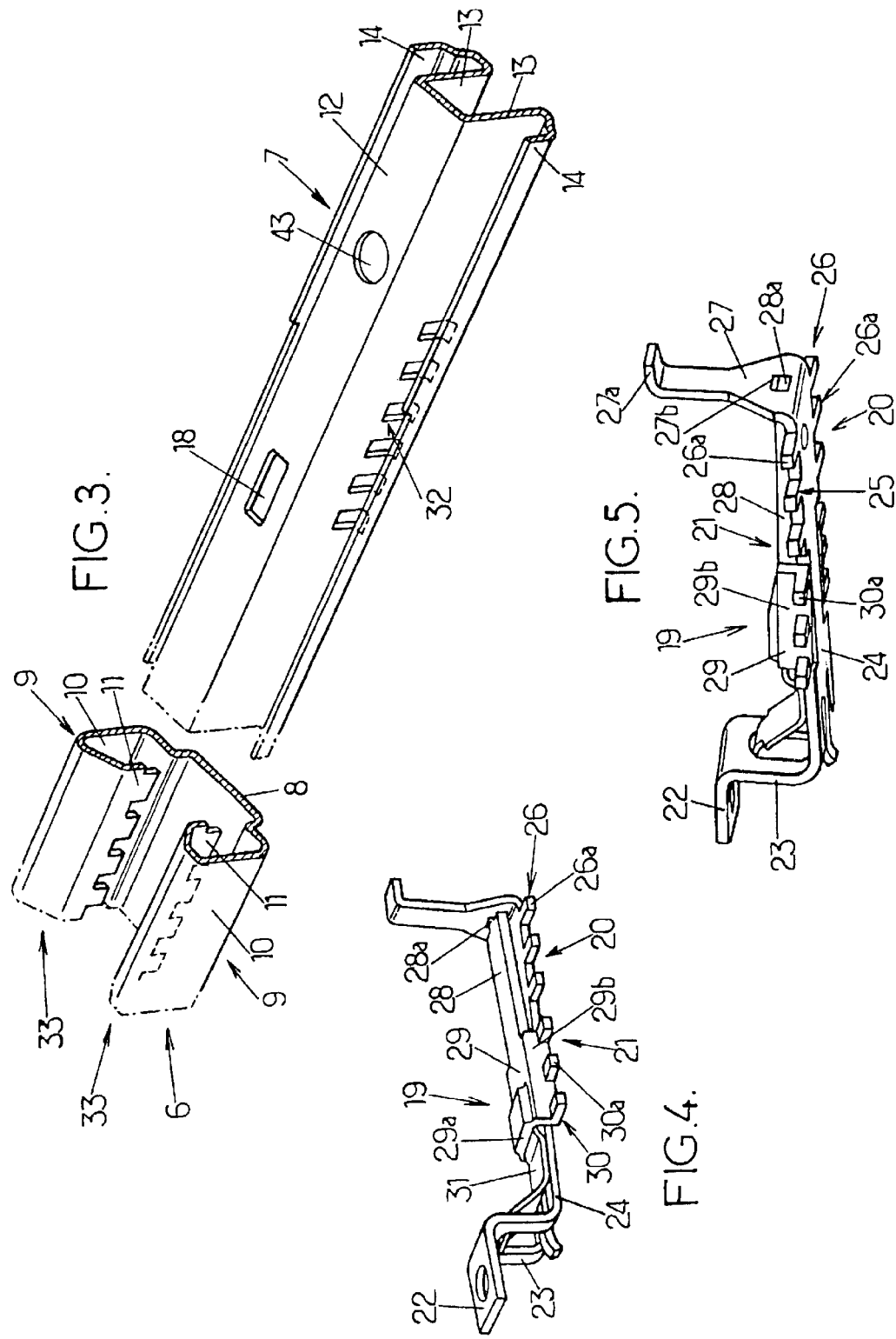

RUNNER FOR A MOTOR VEHICLE SEAT

FIELD OF THE INVENTION

The present invention relates to runners for motor vehicle seats. Such runners are designed to support seats in a manner such that the seats can slide in a direction referred to as "longitudinal" in order to enable them to be adjusted by being moved towards the front or towards the rear of the vehicle. A set of two parallel runners are generally provided for each seat supported.

BACKGROUND OF THE INVENTION

More particularly, the invention relates to such a runner that comprises firstly first and second rails mounted to slide relative to each other in a longitudinal direction, and secondly a locking mechanism for preventing said first and second rails from moving relative to each other, the locking mechanism comprising:

a longitudinal succession of catches carried by the first rail;

a main latch which is provided with a series of teeth and which is connected to the second rail, said main latch being mounted substantially to pivot about a first pivot axis between a locked position in which the series of teeth co-operates with the catches on the first rail so as to prevent the first and second rails from moving relative to each other, and an unlocked position in which the series of teeth does not co-operate with the catches on the first rail so as to enable the first and second rails to move longitudinally relative to each other; and control means comprising a control member that can be moved between a locking position and an unlocking position so as to cause the main latch to pivot from the locked position towards the unlocked position.

When the front or the rear of the vehicle is subjected to an impact, the runners that connect the floor of the vehicle to the unit constituted by the seat and its occupant must thus be adapted to absorb the longitudinal impact in order to hold said seat and its occupant.

The impact is absorbed by means of the main latch, and more exactly by means of its series of teeth that co-operate with the catches on the first rail.

That type of latch is described in particular in Document FR-A-2 736 311.

Unfortunately, the main latch which is mounted to pivot on the second rail can contain only a small number of teeth, e.g. three teeth, serving to co-operate with the catches on the first rail. It is not possible to increase the number of teeth in the series of teeth on the main latch without also increasing the angle through which said main latch pivots between its locked position and its unlocked position, so as to retract all of the teeth of the series of teeth from the catches on the first rail. The angle through which the main latch can pivot is limited by the space defined by the first and second rails. Thus, the number of teeth in the series of teeth on the main latch that are used for absorbing impacts is small, which might give rise to its teeth being deformed or torn off when the vehicle is subjected to a violent impact.

OBJECTS AND SUMMARY OF THE INVENTION

An object of the present invention is to provide a runner capable of absorbing violent impacts suffered by the vehicle without making provision to overdimension the first and second rails.

To this end, according to the invention, in a runner of the type in question, an additional latch is mounted substantially to pivot on the main latch about a second pivot axis, said additional latch being provided with at least a first series of teeth, and the additional latch is interposed between the main latch and the control member so that, when said control member moves from the locking position to the unlocking position, firstly the additional catch is pivoted about the second pivot axis, and secondly the additional latch and the main latch are pivoted about the first pivot axis.

By means of these provisions, the angle through which the series of teeth on the main latch can pivot remains the same, while the first series of teeth on the additional latch pivots relative to the series of teeth on the main latch, about the second pivot axis so as to retract the first series of teeth from the catches on the first rail.

In preferred embodiments of the invention, it is optionally possible to use one or more of the following provisions:

the first series of teeth on the additional latch is disposed between the first pivot axis and the series of teeth on the main latch;

the control member bears against a portion of the additional latch situated between the first pivot axis and the second pivot axis so that firstly the additional latch is pivoted about the second pivot axis in a first pivot direction, and secondly the main latch and the additional latch are pivoted about the first pivot axis in a second pivot direction opposite to the first pivot direction;

the main latch is connected to the second rail via a flexible blade which includes a fixing portion secured to the second rail;

the main latch is extended by a projection which is provided with a recess, and the additional latch includes a coupling portion provided with a projecting member disposed in the recess in the main latch so as to form the second pivot axis, and a locking portion on which the first series of teeth is formed, said locking portion of the additional latch being connected to the flexible blade of the main latch via a spring which, when the control member is in the locking position, makes it possible for the first series of teeth on the additional latch to be engaged between the catches on the first rail;

the locking portion of the additional latch is substantially U-shaped, with a middle branch that extends the coupling portion in alignment therewith and that is disposed facing the flexible blade of the main latch, and with two side branches on which the teeth of the first series of teeth are formed;

the series of teeth on the main latch and the first series of teeth on the additional latch are substantially in alignment with each other when the additional latch and the main latch are in the locked position;

the additional latch includes firstly a coupling portion which is provided with an opening in which a rod is received with clearance, which rod is connected to the main latch so as to form the second pivot axis, and secondly a first locking portion on which the first series of teeth is provided;

the series of teeth on the main latch comprises two teeth disposed transversely on either side of the main latch, and the rod forming the second pivot axis is situated between the two teeth on the main latch, and the additional latch includes a second locking portion on which a second series of teeth is provided, the coupling portion of the additional latch being situated between the first and second locking portions; and each of the first and second locking portions of the additional latch is substantially U-shaped, with a middle branch that extends the coupling portion and side branches on which the teeth of the first and second series of teeth are provided respectively.

BRIEF DESCRIPTION OF THE DRAWINGS

Other characteristics and advantages of the invention appear from the following description of embodiments thereof, given by way of non-limiting example, and with reference to the accompanying drawings.

In the drawings:

FIG. 3 is a fragmentary perspective view of the first and second rails of each runner;

FIGS. 4 and 5 are perspective views of a first embodiment of the main latch and of the additional latch that are designed to equip each runner;

MORE DETAILED DESCRIPTION

In the various figures, like references designate elements that are identical or similar.

Figure 1:
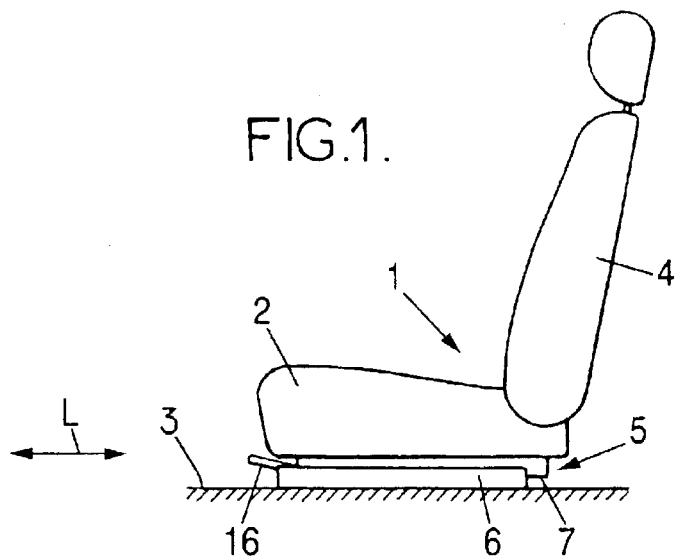
FIG. 1 is a side elevation view of a seat provided with runners of the invention.

FIG. 1 shows a motor vehicle seat 1 which comprises a seat proper 2 mounted on a vehicle floor 3, and a seat back 4 mounted on the seat proper 2. The floor 3 of the vehicle is connected to the seat proper 2 via two runners 5 (only one of which is shown in FIG. 1) making it possible to adjust the position of the seat 1 on the floor 3 of the vehicle by sliding it in a longitudinal direction L.

Figure 2:
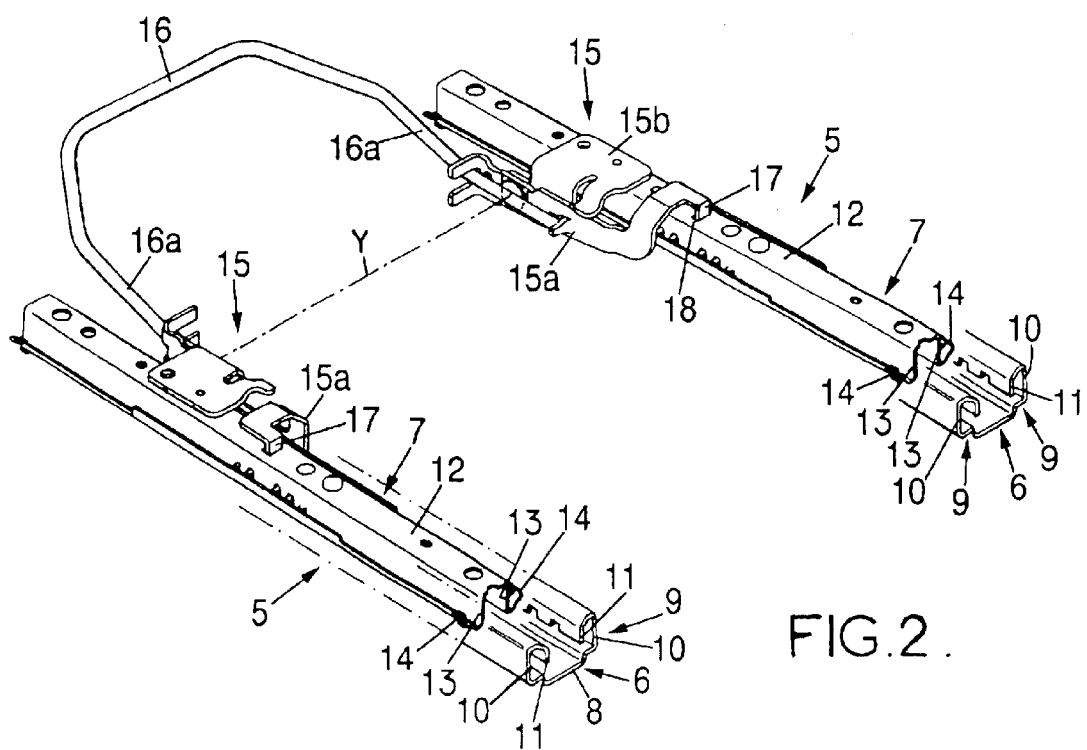
FIG. 2 is a perspective view of runners that can equip the seat of FIG. 1, the first rail of each runner being shown in part only.

Each of the two runners 5 shown in FIG. 2 comprises a first rail or "fixed rail" 6 that is fixed directly to the floor 3 of the vehicle, and a second rail or "moving rail" 7 mounted to slide inside the fixed rail 6. The moving rail 7 is designed to be fixed by any suitable means to the bottom face of the seat proper 2.

As can be seen in more detail in FIGS. 2 and 3, in the example considered herein, the fixed rail 6 is substantially channel-section, with its cross-section comprising a bottom horizontal web 8 from which two side walls 9 extend, each of which is formed by a substantially vertical flange 10, and is extended by a folded-over flange extension 11. Each flange extension 11 of the side walls 9 of the fixed rail 6 extends towards the inside of the channel section and towards the web 8 of said fixed rail 6.

The moving rail 7 is substantially upside-down channel-section, with its cross-section comprising a top horizontal web 12 from which two vertical flanges 13 extend downwards. The two vertical flanges 13 of the moving rail 7 are extended by folded-over lips 14 extending upwards and towards the outside of the channel section.

When the moving rail 7 is assembled to the fixed rail 6 to form the runner 5, the lips 14 of the moving rail 7 are received between the vertical flanges 10 and the flange extensions 11 of the fixed rail 6, while the flange extensions 11 on the fixed rail are received between the vertical flanges 13 and the lips 14 on the moving rail 7.

The side walls 9 of the fixed rail 6 and the lips 14 of the moving rail 7 define recesses shaped so as to form raceways for balls (not shown in the Figures) in order to make it easier for the moving rail 7 to move longitudinally along the fixed rail 6.

As can be seen in FIG. 2, each runner 5 is also provided with locking and unlocking means 15 for locking and unlocking the moving rail 7 relative to the fixed rail 6. The locking and unlocking means 15 are controlled by a control bar or the like in the form of an arcuate bar whose two side branches 16a are connected to the locking and unlocking means 15 of respective ones of the two runners 5. The control bar 16 also has a middle branch situated substantially under the front end of the seat proper 2 so as to be actuated by a user of the seat 1.

As can be seen in FIG. 2, each of the locking and unlocking means 15 comprises a support 15b fixed to the moving rail 7 that is associated with it, e.g. by riveting or welding, and a lever 15a mounted to pivot on the support 15b about a transverse axis Y. The two side branches 16a of the control bar 16 are connected to the two levers 15a in order to enable them to be pivoted by actuating the middle branch of the control bar 16. Each lever 15a of the locking and unlocking means 15 has a control member in the form of a control finger 17 which passes through an opening 18 provided in the top flat web 12 of each moving rail 7.

While the lever 15a is pivoting about the transverse axis Y, said finger 17 serves to move a latch system 19 for enabling the moving rail 7 to be locked or unlocked relative to the fixed rail 6.

FIGS. 4 & 5 and 6a & 6b show a first embodiment of the latch system 19 which comprises a main latch 20 and an additional latch 21.

In the example considered below, the main latch 20 is formed integrally with a flexible blade 25 which is, for example, made of spring steel, and which includes:

- a fixing portion 22 directly fixed to the flat web 12 of the moving rail 7, e.g. by riveting or welding;
- a first projection 23 that is substantially S-shaped and that extends the fixing portion 22; and
- a middle portion 24 which extends substantially on a slant relative to the webs 8, 12 of the fixed and moving rails 6, 7, which middle portion 25 is extended by the latch 20 on which a series of teeth 26 are provided, said series of teeth 26 comprising, for example, three teeth 26a provided on a first side edge of the latch 20 and three other teeth 26a on the second side edge of the latch 20, the teeth 26a on the first side edge and the teeth 26a on the second side edge being disposed symmetrically about the longitudinal direction L.

In the first embodiment, the latch 20 is extended by a second projection 27 which extends substantially vertically to a curved end 27a which passes through an opening 43 provided through the top flat web 12 of the moving rail 7. The curved end 27a of the second projection 27 is designed to come into abutting contact against the top end 12 of the moving rail 7 when the latch 20 is brought into the unlocked position (FIG. 6b), so as to avoid any irremediable deformation of the spring blade 25.

The main latch 20 pivots mainly due to the elastically deformable property of the junction where the first projection 23 meets the intermediate portion 24 of the spring blade 25. Thus, when the control finger 17 of the lever 15a is actuated, as described below, the latch 20 is caused to pivot about a first pivot axis Y1 (see FIGS. 6a and 6b) located substantially at junction where the first shoulder 23 meets the intermediate portion 24 of the flexible blade.

The additional latch 21 includes a locking portion 29 on which a first series of teeth 30 is provided, said locking portion 29 being disposed between the series of teeth 26 on the latch 20 and the first projection 23. The additional latch 21 also includes a coupling portion 28 integral with the locking portion 29, which coupling portion 28 is provided with a projecting member 28a (see FIG. 5) received in a recess 27b provided in the second projection 27 that extends the main latch 20.

As can be seen in FIG. 4, the locking portion 29 of the additional latch 21 is substantially of upside-down U-shape, with firstly a middle branch 29a which extends in alignment with the coupling portion 30 and which is disposed facing the intermediate portion 24 of the flexible blade 25, and secondly two side branches 29b, each of which is provided with three teeth 30a of the first series of teeth 30 of the additional latch 21.

The additional latch 21, or more exactly the middle branch 29a of its locking portion 29 is also connected to the first projection 23 of the flexible blade 25 by means of a spring 31. The spring 31 resiliently urges the middle branch 29a of the additional catch 21 away from middle portion 24 of the flexible blade 25. Thus, the additional latch 21 can be caused to pivot relative to the main latch 20 about a second pivot axis Y2 (see FIGS. 6a and 6b) by means of the projecting member 28a of the additional latch 21 co-operating with the recess 27b in the main latch 20.

The series of teeth 26 on the main latch 20 and the first series of teeth 30 on the additional latch 21 extend transversely beyond the flanges 13 of the moving rail 7 while passing through cutouts 32 of complementary shape provided in the bottom portions of the two vertical flanges 13 of the moving rail 7. In addition, when they pass through the cutouts 32, said series of teeth 26, 30 engage between catches 33 provided on the ends of the flange extensions 11 of the fixed rail 6. In this embodiment of the invention, the series of teeth 26, 30 on the main latch 20 and on the additional latch 21 pass, with minimum operating clearance in the longitudinal direction, between the catches 33 on the fixed rail 6.

Figure 6A:
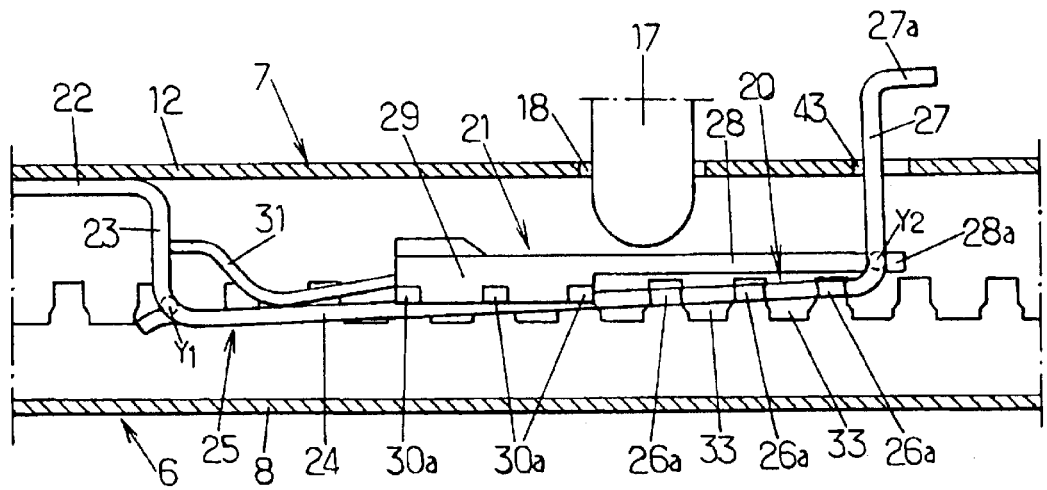
FIGS. 6a and 6b are longitudinal section views showing the main latch and the additional latch in the first embodiment, respectively in the locked position and in the unlocked position.

FIG. 6a diagrammatically shows the respective positions of the main latch 20 and of the additional latch 21 relative to the catches 33 on the fixed rail 6 when said main latch 20 and said additional latch 21 are in the locked position, and when the moving rail 7 is prevented from moving longitudinally relative to the fixed rail 6. In this configuration, the teeth 26a of the series of teeth 26 on the main latch 20 are automatically brought into their locked position under drive from the flexible blade 25. In addition, the teeth 30a of the first series of teeth 30 on the additional latch 21 are brought into their locked position under drive from the spring 31.

Figure 6B:
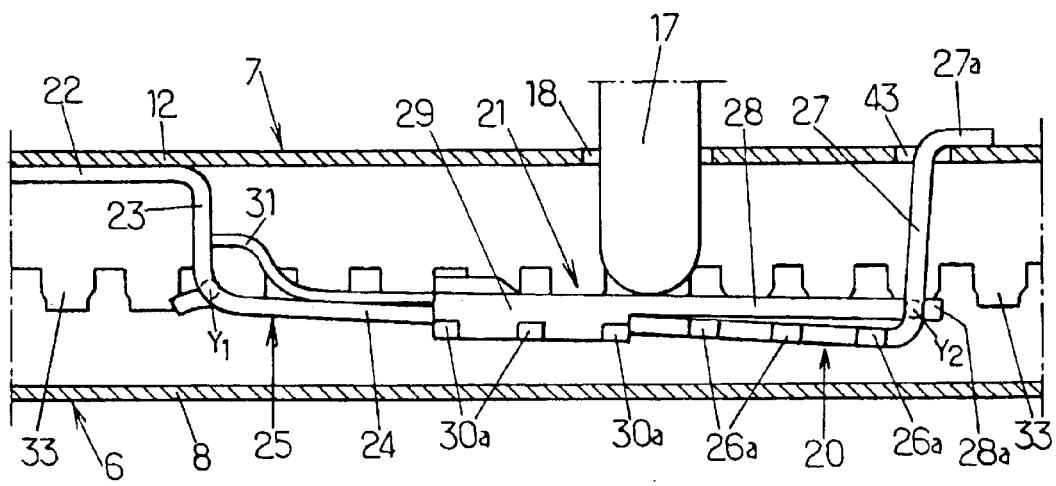

When a user actuates the control bar 16, as shown in FIG. 6b, the control finger 17 presses firstly against the additional latch 21 or more exactly against a portion of the additional latch 21 that is situated between the first pivot axis Y1 about which the main latch 20 pivots and the second pivot axis Y2 about which the additional latch 21 pivots. Thus, while the control finger is moving substantially vertically from its locking position (FIG. 6a) towards its unlocking position, said control finger firstly causes the additional latch 21 to pivot about the second pivot axis Y2 in a first pivot direction until the additional latch 21 comes into abutting contact against the main latch 20. Then, the control finger 17 causes the assembly formed by the additional latch 21 and by the main latch 20 to pivot about the first pivot axis Y1, in a second pivot direction that is opposite to the first pivot direction as defined above.

This double pivoting of the additional latch 21 and thus of the teeth 30a of the series of teeth 30 thus enables said teeth 30a to be fully disengaged from the catches 33 on the fixed rail 6. As can be seen in FIG. 6b, the teeth 30a of the series of teeth 30 on the additional latch 21 come to be positioned under the corresponding portion of the intermediate portion 24 of the flexible blade 25, said corresponding portion of the intermediate portion 24 still being disposed facing the catches 33 on the fixed rail 6. Thus, the presence of the additional latch 21 makes it possible to increase considerably the number of teeth serving to co-operate with the catches 33 on the fixed rail 6, while also enabling the angle through which the main latch 20 can pivot to be small. It can be understood that, if all six teeth 30a of the first series of teeth 30 were placed on the intermediate portion 24 of the main latch 20, said teeth would remain at least partially engaged between the catches 33 on the fixed rail 6.

Figure 7:
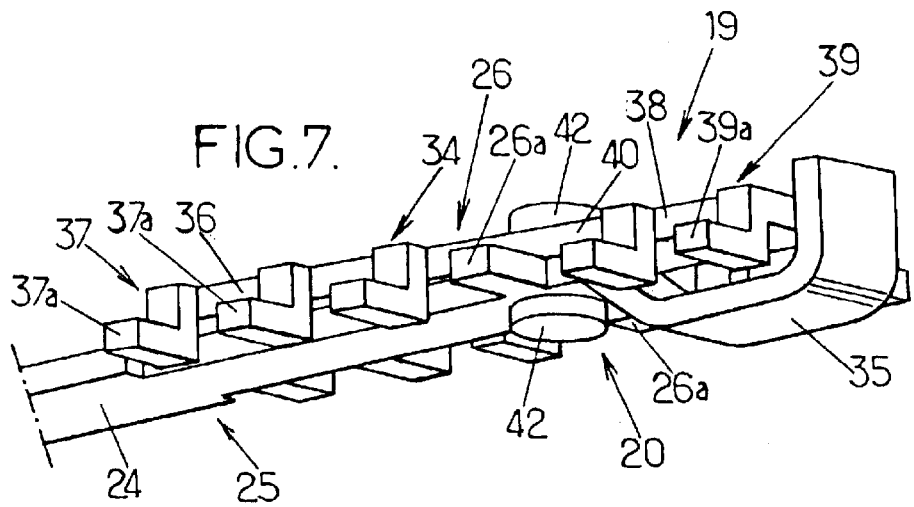
FIG. 7 is a fragmentary perspective view of a second embodiment of the main latch and of the additional latch that are designed to equip each runner.
Figure 8A:
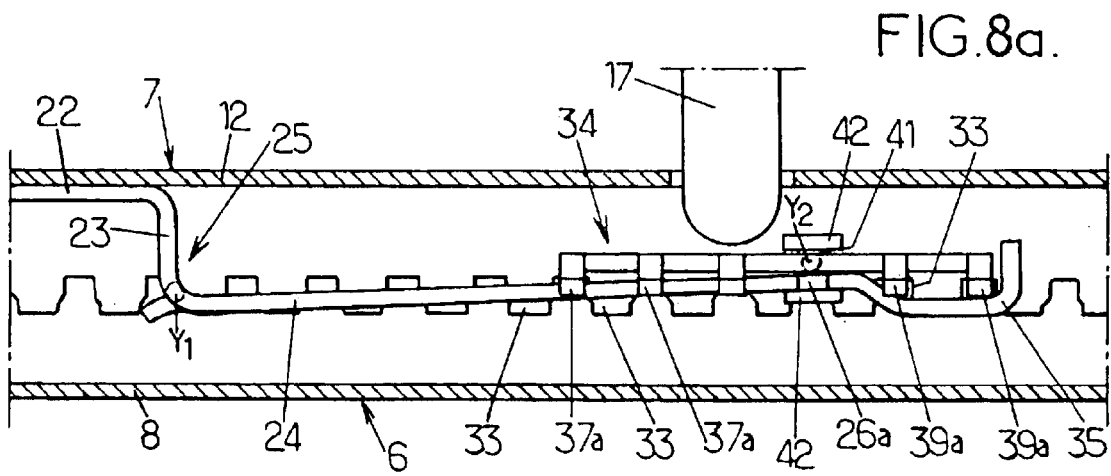
FIGS. 8a and 8b are longitudinal section views showing the main latch and the additional latch in the second embodiment, respectively in the locked position and in the unlocked position.
Figure 8B:
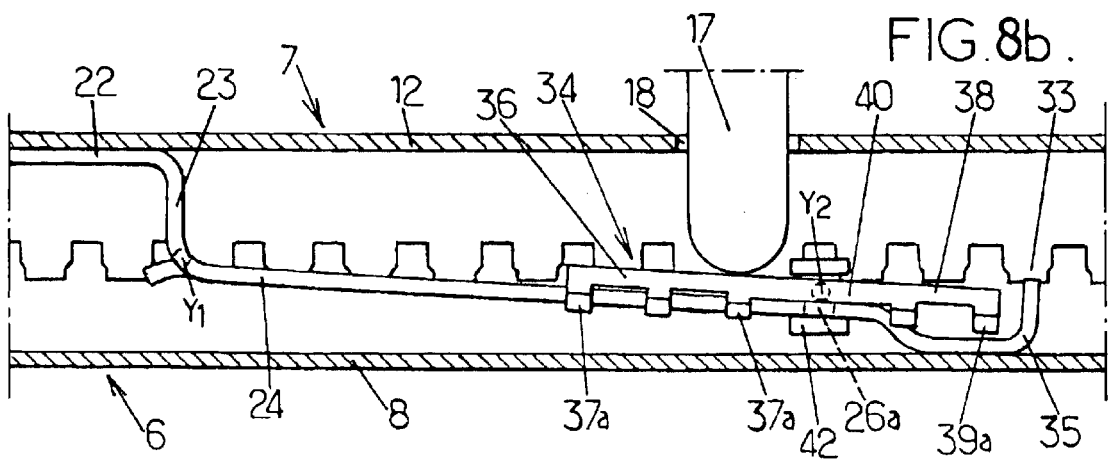

FIGS. 7, 8a, and 8b show a second embodiment of the latch system 19 which comprises the main latch 20 and an additional latch 34.

The main latch 20 is also formed integrally with the flexible blade 25 which includes the fixing portion 22 fixed directly to the moving rail 7, the substantially S-shaped first projection, and the middle portion 24 which is extended by the latch 20. In the second embodiment, the main latch 20 has a series of teeth 26 which comprises only one tooth 26a provided on the first side edge of the latch 20 and one tooth 26a on the second side edge of said latch 20. The two teeth 26a on the latch 20 are disposed symmetrically about the longitudinal direction L. In addition, the main latch 20 is extended by an end portion 35 that is curved downwards and that is substantially U-shaped. The main latch 20 pivoting is also mainly due to the elastically deformable property of the junction where the first projection 23 meets the intermediate portion 24 of the spring blade 25.

The additional latch 34 in this embodiment comprises:

a first locking portion 36 on which a first series of teeth 37 is provided, which series of teeth is disposed between the series of teeth 26 on the main latch 20 and the first projection 23 of the flexible blade 25;

a second locking portion 38 on which a second series of teeth 39 disposed beyond the main latch 20 and facing the end portion 35 of said main latch 20; and a coupling portion 40 disposed between the main locking portion 36 and the second locking portion 38.

The coupling portion 40 of the additional latch 34 has a through opening which receives, with clearance, a rod 41 (FIG. 8a) which also passes through the main latch 20. The top and bottom ends of the rod 41 are secured to two washers 42 for holding the additional latch 34 facing the main latch 20. The rod 41 and the two washers 42 form a substantially transverse second pivot axis Y2 about which the additional latch 34 can pivot.

The first locking portion 36 of the additional latch 34 is substantially U-shaped, with a middle branch that extends the coupling portion 40 in alignment therewith and that is provided with a plurality of side branches which extend downwards and on which the teeth 37a of the first series of teeth 37 are provided.

Similarly, the second locking portion 38 of the additional latch 34 is substantially U-shaped, with a middle branch that extends the coupling portion 40 of the additional latch in alignment with said coupling portion, and it is provided with a plurality of side branches on which the teeth 39a of the second series of teeth 39 are provided.

FIG. 8a diagrammatically shows the respective positions of the main latch 20 and of the additional latch 34 relative to the catches 33 on the fixed rail when said main latch 20 and said additional latch 34 are in the locked position and when the moving rail 7 is prevented from moving longitudinally relative to the fixed rail 6. In this configuration, the teeth 26a of the series of teeth 26 on the main latch 20 are automatically brought into their locked position under drive from the flexible blade 25. Similarly, under drive from the flexible blade 25, the additional latch 34 goes back up into its locked position so that the teeth 39a of the second series of teeth 39 come into engagement with the catches 33 on the fixed rail 6, which causes the first locking portion 36 to pivot about the second transverse pivot axis Y2 so that the teeth 37a of the first series of teeth 37 come into engagement with the catches 33 on the fixed rail 6.

When the user actuates the control bar 16, as shown in FIG. 8b, the control finger 17 presses firstly against the additional latch 34 or more exactly against its first locking portion 36 situated between the first pivot axis Y1 and the second pivot axis Y2 about which said additional latch 34 pivots. Thus, when the control finger 17 moves substantially vertically towards its unlocking position, said control finger causes the additional latch 34 to pivot about the second pivot axis Y2 in a first pivot direction until the first locking portion 36 of said additional latch 34 come into abutting contact against the intermediate portion 24 of the flexible blade 25 formed integrally with the main latch 20. Then, the control finger 17 causes the assembly formed by the additional latch 34 and by the main latch 20 to pivot about the first pivot axis Y1, in a second pivot direction opposite to the first pivot direction as defined below.

Thus, the double pivoting of the additional latch 34 and thus of the teeth 37a of the first series of teeth 37 thus enables said teeth 37a to be fully disengaged from the catches 33 on the fixed rail 6.

As can be seen in FIG. 8b, the teeth 37a of the first series of teeth 37 of the additional latch 34 come to be positioned under the corresponding portion of the intermediate portion 24 of the flexible blade 25.

In addition, when the control finger 17 causes the additional latch 34 to pivot, the teeth 39a of the second series of teeth 39 on the additional latch 34 tend to move away from the end portion 35 of the main latch 20. Said teeth 39a of the second series of teeth 39 thus pivot through an angle that is smaller than the angle through which the end portion 35 of the main latch 20 pivots between the locked position and the unlocked position.

What is claimed is:

1. A runner for a motor vehicle seat, said runner comprising firstly first and second rails mounted to slide relative to each other in a longitudinal direction, and secondly a locking mechanism for preventing said first and second rails from moving relative to each other, the locking mechanism comprising:

a longitudinal succession of catches carried by the first rail;

a main latch which is provided with a series of teeth and which is connected to the second rail, said main latch being mounted substantially to pivot about a first pivot axis between a locked position in which the series of teeth co-operates with the catches on the first rail so as to prevent the first and second rails from moving relative to each other, and an unlocked position in which the series of teeth does not co-operate with the catches on the first rail so as to enable the first and second rails to move longitudinally relative to each other; and control means comprising a control member that can be moved between a locking position and an unlocking position so as to cause the main latch to pivot from the locked position towards the unlocked position;

wherein an additional latch is mounted substantially to pivot on the main latch about a second pivot axis, said additional latch being provided with at least a first series of teeth, and wherein the additional latch is interposed between the main latch and the control member so that, when said control member moves from the locking position to the unlocking position, firstly the additional catch is pivoted about the second pivot axis, and secondly the additional latch and the main latch are pivoted about the first pivot axis.

2. A runner according to claim 1, in which the first series of teeth on the additional latch is disposed between the first pivot axis and the series of teeth on the main latch.

3. A runner according to claim 1, in which the control member bears against a portion of the additional latch situated between the first pivot axis and the second pivot axis so that firstly the additional latch is pivoted about the second pivot axis in a first pivot direction, and secondly the main latch and the additional latch are pivoted about the first pivot axis in a second pivot direction opposite to the first pivot direction.

4. A runner according to claim 1, in which the main latch is connected to the second rail via a flexible blade which includes a fixing portion secured to the second rail.

5. A runner according to claim 4, in which the main latch is extended by a projection which is provided with a recess, and the additional latch includes a coupling portion provided with a projecting member disposed in the recess in the main latch so as to form the second pivot axis, and a locking portion on which the first series of teeth is formed, said locking portion of the additional latch being connected to the flexible blade of the main latch via a spring which, when the control member is in the locking position, makes it possible for the first series of teeth on the additional latch to be engaged between the catches on the first rail.

6. A runner according to claim 5, in which the locking portion of the additional latch is substantially U-shaped, with a middle branch that extends the coupling portion in alignment therewith and that is disposed facing the flexible blade of the main latch, and with two side branches on which the teeth of the first series of teeth are formed.

7. A runner according to claim 1, in which the series of teeth on the main latch and the first series of teeth on the additional latch are substantially in alignment with each other when the additional latch and the main latch are in the locked position.

8. A runner according to claim 4, in which the additional latch includes firstly a coupling portion which is provided with an opening in which a rod is received with clearance, which rod is connected to the main latch so as to form the second pivot axis, and secondly a first locking portion on which the first series of teeth is provided.

9. A runner according to claim 8, in which the series of teeth on the main latch comprises two teeth disposed transversely on either side of the main latch, and the rod forming the second pivot axis is situated between the two teeth on the main latch, and in which the additional latch includes a second locking portion on which a second series of teeth is provided, the coupling portion of the additional latch being situated between the first and second locking portions.

10. A runner according to claim 9, in which each of the first and second locking portions of the additional latch is substantially U-shaped, with a middle branch that extends the coupling portion and side branches on which the teeth of the first and second series of teeth are provided respectively.

* * * * *